United States Patent [19]

Langen

[11] 4,101,020
[45] Jul. 18, 1978

[54] PACKAGING MACHINE TRANSFER MECHANISM

[75] Inventor: Marinus J. M. Langen, Rexdale, Canada

[73] Assignee: H. J. Langen & Sons Ltd., Rexdale, Canada

[21] Appl. No.: 773,324

[22] Filed: Mar. 1, 1977

[51] Int. Cl.² ............................................. B65G 47/52
[52] U.S. Cl. .................................... 198/478; 198/462; 198/655; 198/732
[58] Field of Search ............... 198/459, 461, 462, 478, 198/482, 539, 600, 653, 654, 655, 719, 728, 732

[56] References Cited

U.S. PATENT DOCUMENTS

| | | | |
|---|---|---|---|
| 2,649,675 | 8/1953 | Schrage | 198/732 |
| 2,714,441 | 8/1955 | Nolt | 198/719 |
| 2,840,224 | 6/1958 | Lefief | 198/461 |
| 2,861,677 | 11/1958 | van Marle | 198/732 |
| 3,015,919 | 1/1962 | MacDonald | 198/461 |
| 3,228,171 | 1/1966 | Cory | 198/732 |
| 3,333,677 | 8/1967 | Harrison et al. | 198/732 |
| 3,335,841 | 8/1967 | Klingel et al. | 198/728 |
| 3,474,896 | 10/1969 | Kamila | 198/732 |
| 3,533,496 | 10/1970 | Atwood | 198/732 |
| 3,879,920 | 4/1975 | Langen | 53/195 |

FOREIGN PATENT DOCUMENTS

| | | | |
|---|---|---|---|
| 594,968 | 3/1960 | Canada | 198/728 |
| 2,226,340 | 1/1974 | France | 198/461 |

Primary Examiner—Evon C. Blunk
Assistant Examiner—Richard K. Thomson

Attorney, Agent, or Firm—Fetherstonhaugh & Co.

[57] ABSTRACT

In a packaging machine having a load transfer station and a packaging station there is provided an improved mechanism for loading articles onto a main conveyor for movement through the packaging station. A plurality of article receiving compartments are carried by the main conveyor at longitudinally spaced intervals thereon, each compartment having a front wall and a back wall projecting outwardly from and spaced longitudinally with respect to the main conveyor, the compartments opening upwardly away from the main conveyor. A loading platform is located in the load transfer station and disposed in a transfer plane. The loading platform has a discharge edge at one end thereof. A mechanism is provided for depositing articles onto the loading platform. The main conveyor is supported to guide the article receiving compartments in a loading path which includes an arcuate section disposed adjacent to and below the loading platform and a straight section which extends forwardly from the arcuate section outwardly from the discharge edge such that the front wall of each compartment emerges from below the loading plane and projects upwardly in front of the discharge edge to form a stop against which articles are driven by a discharge mechanism and thereafter the back wall emerges from below the loading plane to retain transferred articles in the article receiving compartments and the compartments are conveyed away from the loading station along the straight section of the loading path for subsequent packaging.

6 Claims, 4 Drawing Figures

PACKAGING MACHINE TRANSFER MECHANISM

This invention relates to improvements in transfer mechanism for loading articles into article receiving compartments of a moving conveyor. In particular, this invention relates to an improved load transfer mechanism for use in a packaging machine.

PRIOR ART

The improved transfer mechanism of the present invention is suitable for use in a packaging machine of the type described in U.S. Pat. No. 3,879,920 dated Apr. 29, 1975 and U.S. Pat. No. 3,968,623 dated July 13, 1976.

In the transfer mechanism described in U.S. Pat. No. 3,879,920, the articles which are to be loaded into the article receiving compartments fall under gravity and the speed of movement of the apparatus is limited by this characteristic. In addition, the ability of this prior apparatus to size a flexible package to proportions suitable to fit within the article receiving compartment is somewhat limited.

In the load transfer mechanism of the present application, the articles are positively located within the article receiving compartments by reason of the fact that the articles are driven into engagement with one wall of the article receiving compartments as they are discharged from the loading platform. In addition, the discharge drive mechanism may operate at a speed which is greater than the speed of forward movement of the article receiving compartment so that the articles may be compressed against the front wall of the compartment into which they are loaded by means of the pusher blade of the discharge mechanism so as to be sized to fit within the article receiving compartment.

By reason of the fact that the pusher blades move at a speed which is greater than the forward movement of the article receiving compartments, the angular inclination of the blades may be altered as they overtake the article receiving compartments so that the blades act as a top wall which will restrict the extent to which the articles project upwardly from the article receiving compartments.

In order to ensure that the pusher blades do not damage any article which they come in contact with during the pushing operation, the blades are mounted to pivot rearwardly in a direction opposite to the forward movement of the articles through the transfer station so as to yield when contacting an abnormal resistance to forward movement.

According to one aspect of the present invention, there is provided in a packaging machine having a load transfer station and a packaging station, the improvement of a main conveyor mounted for continuous longitudinal movement through said load transfer station and said packaging station, a plurality of article receiving compartments carried by said main conveyor at longitudinally spaced intervals thereon, each of said compartments having a front wall and a back wall projecting outwardly from and longitudinally spaced with respect to said main conveyor, said compartments opening upwardly away from said main conveyor, a loading platform in said load transfer station and disposed in a transfer plane, said loading platform having a discharge edge at one end thereof, means for depositing articles onto said loading platform, discharge means associated with said loading platform for moving articles along said loading platform to discharge them over said discharge edge, means supporting said main conveyor to guide said article receiving compartments in a loading path which includes an arcuate section disposed adjacent to and below said loading platform and a straight section which extends forwardly from said arcuate section outwardly from said discharge edge such that the front wall of each compartment emerges from below said loading plane and projects upwardly in front of said discharge edge to form a stop against which articles are driven by said discharge means and thereafter said back wall emerges from below said loading plane to retain transferred articles in said article receiving compartment and the compartments are conveyed from said loading station along said straight section of said loading path for subsequent packaging According to a further aspect of the present invention, there is provided, in a packaging machine as described above, a transfer mechanism in which the discharge means is adapted to move articles along the loading platform at a speed which is greater than the speed of forward movement of the article receiving compartments as they emerge from below the discharge edge of the loading platform whereby the articles discharged thereby are urged into engagement with the front wall of the article receiving compartment in which they are to be located.

PREFERRED EMBODIMENT

The invention will be more clearly understood after reference to the following detailed specification read in conjunction with the drawings, wherein FIG. 1 is a pictorial view of a transfer mechanism according to an embodiment of the present invention;

Figure 1:
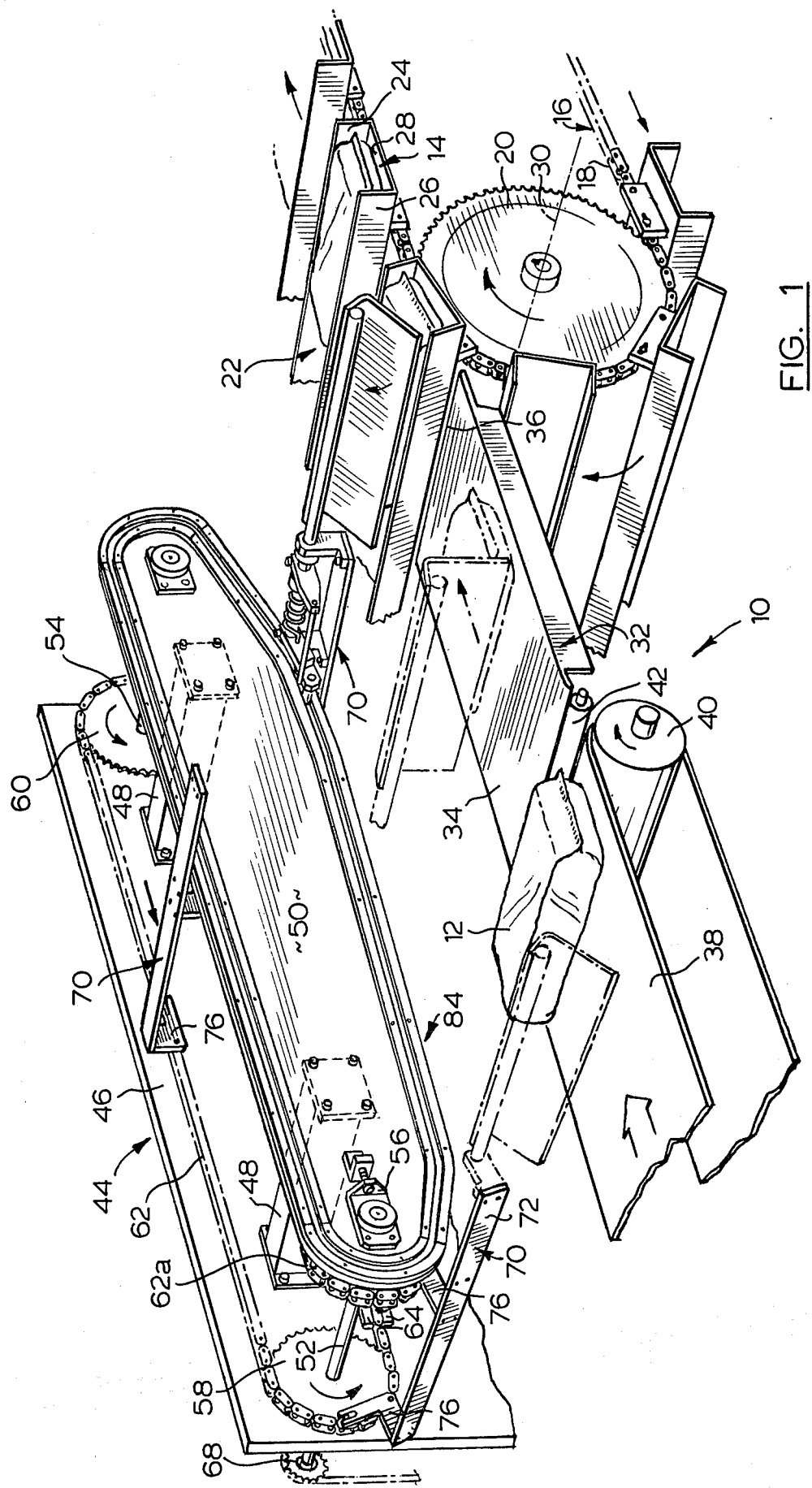

With reference to the drawings, the reference numeral 10 refers generally to a transfer mechanism according to an embodiment of the present invention. As previously indicated, this transfer mechanism is suitable for use in association with a packaging machine of the type described in U.S. Pat. No. 3,968,623.

The load transfer mechanism 10 is located in the load transfer station of the packaging machine so that articles 12 are loaded into the article receiving compartments 14 of the main conveyor 16.

The main conveyor 16 may be constructed in accordance with the main conveyor of U.S. Pat. No. 3,879,920 and is not illustrated in detail in the present application. The conveyor 16 has a pair of drive chains 18 (only one shown) extending around a pair of drive sprockets 20 to reverse its direction of movement. The article receiving compartments are formed by a plurality of U-shaped buckets 22, each of which has a front wall 24, back wall 26 and bottom wall 28 arranged in a U-shaped configurtion. The buckets 22 extend transversely of the main conveyor 16. In moving around the sprocket 20, the article receiving compartments 14 move in a loading arcuate path about the axis 30 of the sprockets 20.

A loading platform 32 is supported by a suitable frame (not shown) with the transfer support surface 34 thereof located in a transfer plane. The platform 32 has a discharge edge 36 at one end thereof. The platform 32 is longitudinally aligned with the main conveyor 16. An article feeding conveyor 38 has its discharge end extending around a support roller 40 located adjacent the input edge of the loading platform 32 and an idler roller 42 is provided to facilitate the movement of the articles 12 from the feeding conveyor 38 to the transfer surface 34 of the loading platform 32.

Figure 3:
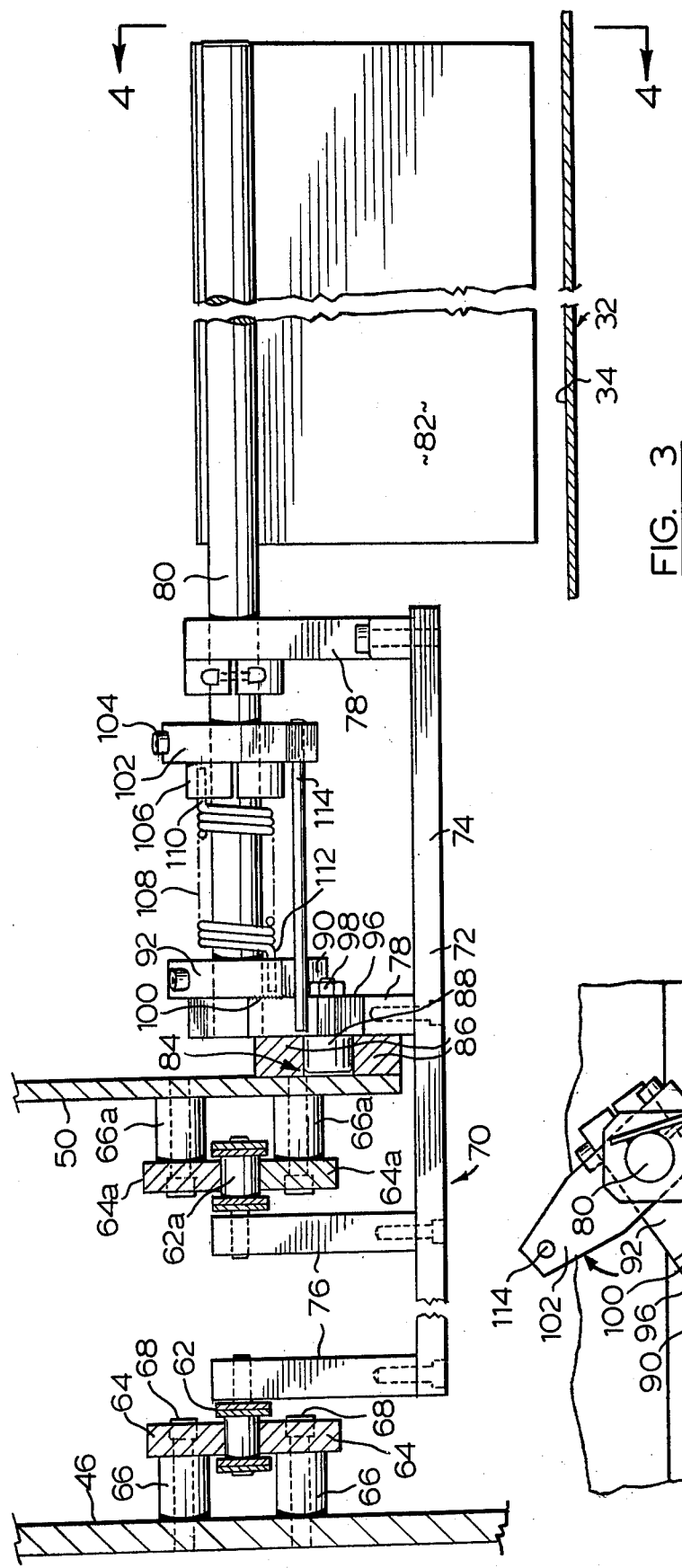
FIG. 3 is a sectional view along the line 3—3 of FIG. 2.

The discharge mechanism, generally identified by the reference numeral 44, serves to move the articles 12 along the loading platform 32 and transfers them into the article receiving compartments 14. The discharge mechanism includes a support frame member 46 which may be a structural component of the packaging machine. A pair of transfer support posts 48 project outwardly from the frame 46 and a face plate 50 is secured to the outer ends of the support posts 48 in a spaced parallel relationship to the frame member 46. Shafts 52 and 54 are journalled in the frame member 46 and face plate 50 respectively. A tension adjustment mechanism, generally identified by the reference numeral 56, is provided at opposite ends of the shaft 52. A pair of chain sprockets 58 are mounted on the shaft 54. Endless chains 62 and 62a extend around sprockets 58 and 60. A sprocket 58 is mounted on the end of the shaft 52 and is drivingly connected to a suitable power source so that shaft 52 may be rotatably driven to rotate the sprockets 58 to drive chains 62 and 62a. A pair of guide rails 64 (see also FIG. 3) are mounted on the frame member 46 by means of spacers 66 and mounting screws 68. The guide rails 64 extend along the lower run of the chain 62 to support the chain 62. Similar guide rails 64a are supported by supports 66a which are secured with respect to the plate 50. The guide rails 64a serve to support the lower run of the chain 62a. Three pusher blade assemblies, generally identified by the reference numeral 70, are mounted on chains 62 and 62a at uniformly spaced intervals along the length thereof.

Figure 4:
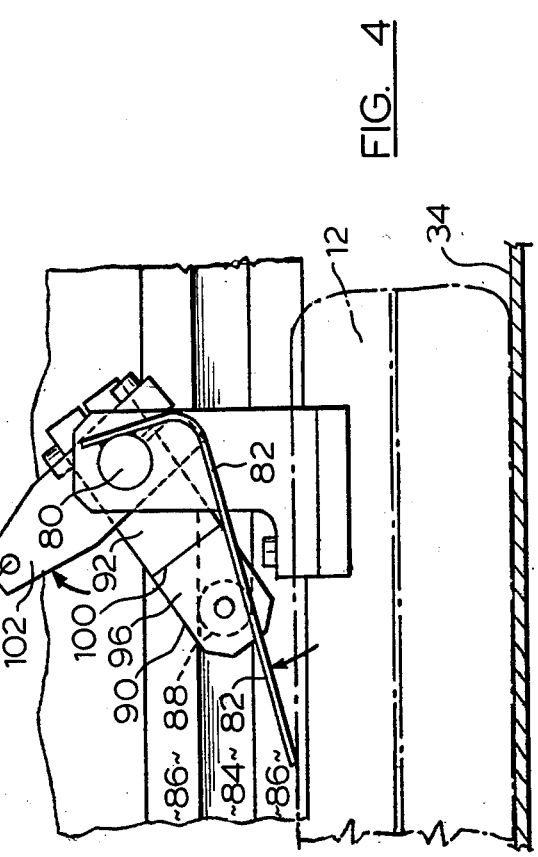
FIG. 4 is an end view in the direction of the arrows 4—4 of FIG. 3.

Each of the pusher blade assemblies 70 includes a frame 72. The frame 72 consists of a laterally extending support bar 74 which is mounted on chains 62 and 62a by support brackets 76. Support posts 78 extend perpendicularly from the support bar 74 and are located outwardly from the face plate 50. A blade support shaft 80 is pivotably mounted in the brackets 78 and extends transversely therebetween and projects laterally outwardly therefrom. A sheet metal pusher blade 82 is secured as by welding to the shaft 80 in a position so that it will overlie the transfer surface 34 of the platform 32 as the discharge mechanism is driven along the transfer path. The angular position of the blade 82 with respect to the platform 32 is controlled by a guide track, generally identified by reference numeral 84, which extends about the periphery of the face plate 50. The guide track 84 consists of a pair of rails 86 arranged in a spaced parallel relationship and secured to the outer face of the face plate 50. A follower roller 88 fits within and runs along the guide track 84 and is mounted on a lever arm 90 which projects from the support shaft 80. The lever arm 90 consists of a first portion 92 which is rotatably mounted on the shaft 80 and a second portion 96 on which the follower 88 is secured by nut 98. The second portion 96 of the lever arm 90 is secured to the first portion 92 as by welding as shown at the lap joint 100. A clamping collar 102 is securely clamped to the shaft 80 by clamping screw 104. The collar 102 has a neck portion 106 projecting outwardly therefrom. A coil spring 108 has one end 110 secured to the neck portion 106 of the clamping collar 102 and its other end 112 secured to the lever arm 90. A pressure bar 114 has one end secured to the collar 102 and its other end overlying the lever arm 90. The coil spring 108 operates to urge the collar 102 to rotate in a direction to cause the pressure bar 114 to rest against the lever arm 90. As previously indicated, the shaft 80 can rotate within the lever arm 92 and consequently it is the movement of the pressure bar 114 in response to movement of the lever arm 90 which causes angular movement of the shaft 80 as the follower 88 travels along the guide track 84. By reason of the fact that the shaft 80 can rotate with respect to the lever arm 92, the pusher blade is not positively driven downwardly towards the loading platform so that if, as shown in FIG. 4 of the drawings, an article 12 is not correctly positioned for engagement with the pusher blade to be pushed through the loading station, the blade 82 may remain in an elevated position by applying a torque to the coil spring 108. In this position the pressure bar 114 is elevated out of contact with the lever arm 90. In this manner, the contents of the package 12 are not destroyed and the pusher blade 82 is not damaged as a result of the misalignment of the article 12. Longitudinal movement of the shaft 80 in a direction away from the face plate 50 is prevented by collar 94 which is mounted on shaft 80 and engages the outer support post 78.

Figure 2:
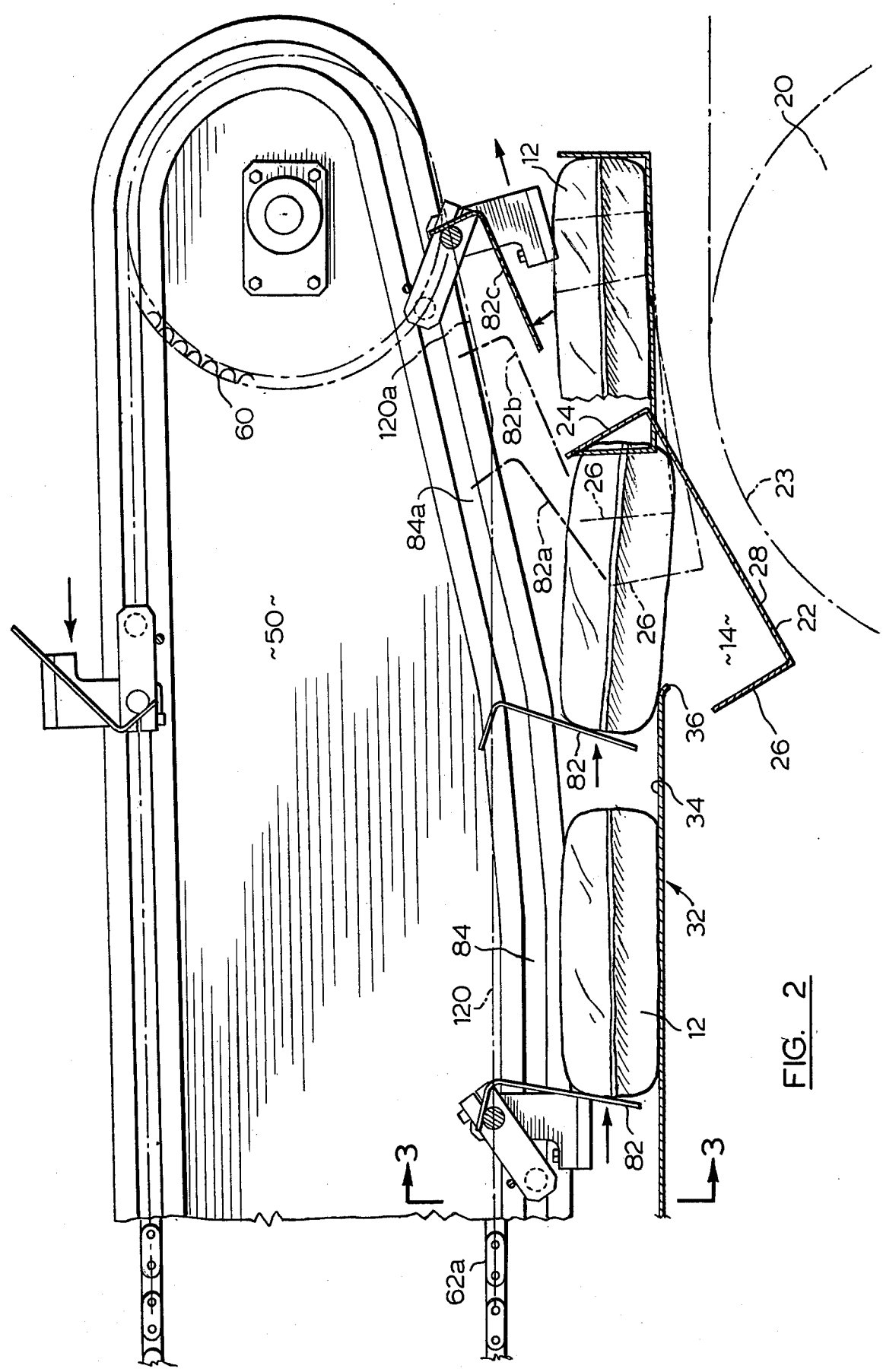
FIG. 2 is an enlarged sectional side view of a portion of the transfer mechanism of FIG. 1.

With reference to FIG. 2 of the drawings, the path of travel of the chain 62 as dictated by guide rails 64 is illustrated by the chain line 120. This path 120 has a portion 120a at one end thereof which is angularly inclined upwardly towards the sprocket 60. Again as shown in FIG. 2 of the drawings, the guide track 84 has a portion 84a at one end thereof which is angularly inclined upwardly away from the transfer plane. The path of the forward run of the guide track 84 including the section 84a is inclined relative to the path of the forward run of the chains 62, 62a so that the angular position of the pusher blades 82 with respect to the loading plane 43 is angularly adjusted through the various angular positions illustrated in FIG. 2.

As shown in FIG. 2 of the drawings, as the U-shaped buckets 22 are driven in the arcuate path 23 about sprockets 20, the front wall 24 is loated in a position projecting upwardly from the transfer plane 34 while the back wall 26 is located a substantial distance below the transfer plane 34. In use, the pusher blades 82 are driven along the forward run of the discharge conveyor at a speed which is greater than the speed of forward movement of the buckets 22 and the movement of the pusher blades 82 is synchronized with respect to the movement of the front wall of each successive bucket so that the pusher blades 82 push the article 12 over the discharge edge 36 of the platform 32 into engagement with the front wall 24 of each successive bucket as the buckets are elevated into the loading plane. By reason of the fact that the pusher blade 82 moves at a forward speed which is greater than the forward speed of the bucket 28, the movement of the pusher blade can be synchronized with respect to the movement of the front wall of the buckets to reach a point where the distance between the front wall and the pusher blade is less than the distance between the front wall and the back wall of a compartment. The path of the guide trade 84 and 84a is such that as the pusher blade 82 overtakes the back wall 26 in the course of movement through the loading station, the blade 82 pivots rearwardly so that it is elevated above the compartment 14 and initially assumes a position shown in broken lines at 82a. As a result of further forward movement of the blade 82, it is further elevated to the position shown at 82b in which it has further overtaken the back wall 26 of its associated compartment. The blade 82 will continue to overtake its associated compartment 14 as it passes through the transfer station to the position shown at 82c. This forward motion of the blade 82 with respect to the compartment 14 of the associated bucket serves to ensure that the article 12 which is located within the associated bucket is correctly seated and does not project upwardly from the compartment 14 in a position which would interfere with the subsequent package loading or wrapping operation.

The transfer mechanism of the present invention is capable of operating at high speed by reason of the fact that the pusher blades drive the articles directly in the article receiving compartments of the main conveyor. The front wall 26 of the buckets forms a positive stop wall against which an article may be driven as it is discharged over the discharge edge of the loading platform. This characteristic enables the apparatus to operate at high speed. By reason of the fact that the pusher blades are longitudinally driven at a speed which is greater than the speed of forward movement of the article receiving compartments, the pusher blades compress the article to ensure that it will fit within the article receiving compartment. The fact that the speed of forward movement of the pusher blades is greater than that of the article receiving compartments also permits the discharge apparatus to operate with relatively few pusher blades while extending over a loading platform of substantial length. It will be apparent from FIG. 1 of the drawings that if the speed of forward movement of the pusher blades was substantially the same as that of the article receiving compartments, it would be necessary to space the pusher blades along the discharge conveyor at distances equal to the spacing of the article receiving compartments on the main conveyor. This would substantially increase the number of pusher blades required and increase the complexity of the apparatus.

It will also be apparent that by reason of the fact that the front wall of each article receiving compartment forms a stop for the articles which are driven along the discharge plane, it is not necessary to provide a leading and trailing blade in order to effect a sizing of the articles which are to be loaded into the article receiving compartments.

These and other advantages of the present invention will be apparent to those skilled in the art.

What I claim as my invention is:

1. In a packaging machine having a load transfer station and a packaging station, the improvement of;
   (a) a main conveyor mounted for continuous longitudinal movement through said load transfer station and said packaging station,
   (b) a plurality of article receiving compartments carried by said main conveyor at longitudinally spaced intervals thereon, each of said compartments having a front wall and a back wall projecting outwardly from and longitudinally spaced with respect to said main conveyor, said compartments opening upwardly away from said main conveyor,
   (c) a loading platform in said load transfer station and disposed in a transfer plane, said loading platform having a discharge edge at one end thereof,
   (d) means for depositing articles onto said loading platform,
   (e) discharge means associated with said loading platform for moving articles along said loading platform to discharge them over said discharge edge,
   (f) means supporting said main conveyor to guide said article receiving compartments in a loading path which includes an arcuate section disposed adjacent to and below said loading platform and a straight section which extends forwardly from said arcuate section outwardly from said discharge edge such that the front wall of each compartment emerges from below said loading plane and projects upwardly in front of said discharge edge to form a stop against which articles are driven by said discharge means and thereafter said back wall emerges from below said loading plane to retain transferred articles in said article receiving compartment as the compartments are conveyed from said loading station along said straight section of said loading path for subsequent packaging,
   (g) said discharge means being adapted to move articles along said platform at a speed which is greater than the speed of forward movement of said article receiving compartments as they emerge from below said discharge edge of said platform whereby the articles discharged thereby are urged into engagement with the front wall of the article receiving compartment in which they are located,
   (h) said discharge means comprising a plurality of pusher blades mounted for movement along a path which includes a forward run which is disposed above said platform, said forward run including a transfer section projecting forwardly and inclined upwardly from adjacent said discharge edge of said platform whereby said pusher blades are elevated out of the path of the back wall of said compartments as the back wall emerges from below said platform,
   (i) said pusher blades being mounted to pivot about an axis extending transversely of the longitudinal extent of said main conveyor and guide rail means coextensive with at least said transfer section of said forward run of said guide rail means cooperating with said pusher blades to cause said pusher blades to pivot rearwardly and upwardly away from said loading plane as the pusher blades move forwardly along said transfer section to direct an article forwardly and downwardly into an article receiving compartment, the pusher blades moving forwardly relative to a compartment after loading thereof to be disposed in an overlying relationship thereto thus ensuring that the article located in the compartment does not project excessively upwardly from said compartment.

2. A packaging machine as claimed in claim 1 wherein said back wall of each compartment has an upper edge and said pusher blades each have a lower edge, the movement of the pusher blades relative to the article receiving compartment being such that a lower edge of a pusher blade is disposed in front of and above an upper edge of a back wall of an article receiving compartment when said lower and upper edges are disposed in their most closely adjacent relationship during movement through said load transfer station.

3. A packaging machine as claimed in claim 2 wherein said pusher blades are free to pivot rearwardly about said transverse axis independently of said guide rail means to avoid crushing a misaligned article located between the pusher blade and the loading platform, and including spring means normally urging said pusher blades to rotate in a forwad direction, the forward rotation being limited to that required to permit said guide rail means to control the movement of said pusher blades.

4. In a packaging machine in which an endless main conveyor moves a plurality of article receiving compartments continuously through a load transfer station and thereafter through a packaging station, the article receiving compartments each having a front wall, a back wall and a bottom wall arranged in a U-shaped configuration extending transversely of said main conveyor, the improvement of a transfer mechanism in said load transfer station comprising:
  (a) a loading platform located in a loading plane in said load transfer station, said platform being located in alignment with said main conveyor and having a discharge edge extending transversely of one end thereof,
  (b) a feeding conveyor for feeding articles one at a time onto said loading platform,
  (c) a discharge conveyor having a forward run disposed above said loading platform, a section of said forward run being located forwardly from said discharge edge and being inclined upwardly and forwardly therefrom,
  (d) a guide track coextensive with at least said section of said discharge conveyor and a portion of said forward run immediately preceding said section,
  (e) a plurality of pusher blade assemblies each including a frame mounted on said discharge conveyor for movement therewith, a blade support shaft pivotably mounted in and projecting laterally outwardly from said frame, a pusher blade mounted on said blade support shaft to overly and project downwardly towards said loading platform during forward movement along said discharge conveyor, a follower member mounted for movement along said guide track and a lever arm connecting said follower to said blade support shaft to control the angular position of said pusher blade with respect to said loading plane,
  (f) said main conveyor extending around a direction reversing arc of curvature disposed adjacent to and below said loading platform, the front wall of each compartment emerging from below said loading plane in front of said discharge edge of said loading platform to project uwardly from said loading plane to form a stop against which articles are driven by said pusher blade before said back wall emerges from below said loading plane to retain transferred articles in said article receiving compartments,
  (g) discharge drive means driving said discharge conveyor means faster than said article receiving compartments whereby each article is compressed to a size to fit within said article receiving compartment when driven against said front wall as aforesaid, said guide track being angularly inclined relative to said forward run whereby each pusher blade is pivoted rearwardly as it overtakes the back wall of said article receiving compartments to be disposed directly above the bottom wall of said article receiving compartments and thereby further ensure the correct location of articles within said article receiving compartments.

5. In a packaging machine having a load transfer station and a packaging station, the improvement of;
  (a) a main conveyor mounted for continuous longitudinal movement through said load transfer station and said packaging station,
  (b) a plurality of article receiving compartments carried by said main conveyor at longitudinally spaced intervals thereon, each of said compartments having a front wall and a back wall projecting outwardly from and longitudinally spaced with respect to said main conveyor, said compartments opening upwardly away from said main conveyor,
  (c) a loading platform in said load transfer station and disposed in a transfer plane, said loading platform having a discharge edge at one end thereof,
  (d) means supporting said main conveyor to guide said article receiving compartments in a loading path which includes an arcuate section disposed adjacent to and below said loading platform and a straight section which extends forwardly from said arcuate section outwardly from said discharge edge such that the front wall of each compartment emerges from below said loading plane and projecting upwardly in front of said discharge edge to form a stop against which articles are driven by said discharge means and thereafter said back wall emerges from below said loading plane to retain transferred articles in said article receiving compartment as the compartments are conveyed from said loading station along said straight section of said loading path for subsequent packaging,
  (e) discharge means associated with said loading platform for moving articles along said loading platform to discharge them over said discharge edge, said discharge means including pusher blade means adapted to move articles along said platform at a speed which is greater than the speed of forward movement of said article receiving compartments as they emerge from below said discharge edge of said platform, said discharge means moving said pusher blades to a transfer position within said transfer station which is closer to said front wall of its associated compartment than is the corresponding back wall whereby the articles discharged thereby are urged into engagement with the front wall of the article receiving compartment in which they are located to size the articles to fit within the article receiving compartment.

6. In a packaging machine having a load transfer station and a packaging station, the improvement of:
  (a) a main conveyor mounted for continuous longitudinal movement through said load transfer station and said packing station,
  (b) a plurality of article receiving compartments carried by said main conveyor at longitudinally spaced intervals thereon, and opening upwardly therefrom, said main conveyor driving said article receiving compartment through said transfer station at a first speed,
  (c) a loading platform in said load transfer station and disposed in a transfer plane, said loading platform having a discharge edge at one end thereof,
  (d) means for depositing articles onto said loading platform,
  (e) discharge means associated with said loading platform for moving articles along said loading platform to discharge them over said discharge edge at a forward speed greater than said first speed, (f) said discharge means comprising a plurality of pusher blades mounted for movement along a path which includes a forward run which extends above said loading platform and an adjacent portion of said main conveyor, said forward run including a transfer section projecting forwardly from said discharge end of said platform above said main conveyor, each of said pusher blades being mounted to pivot about an axis extending transversely across the longitudinal extent of the main conveyor, and (g) means for pivoting said pusher blades rearwardly and upwardly away from said loading plane as said pusher blades move forwardly along said transfer section at a speed greater than said first speed to permit sizing compression while preventing excessive compression of an article as it is driven into one of said compartments.

* * * * *